Feb. 6, 1968  S. G. WALTERS  3,367,219
PIPE CUTTING AND BEVELING APPARATUS
Filed April 22, 1966  2 Sheets-Sheet 1
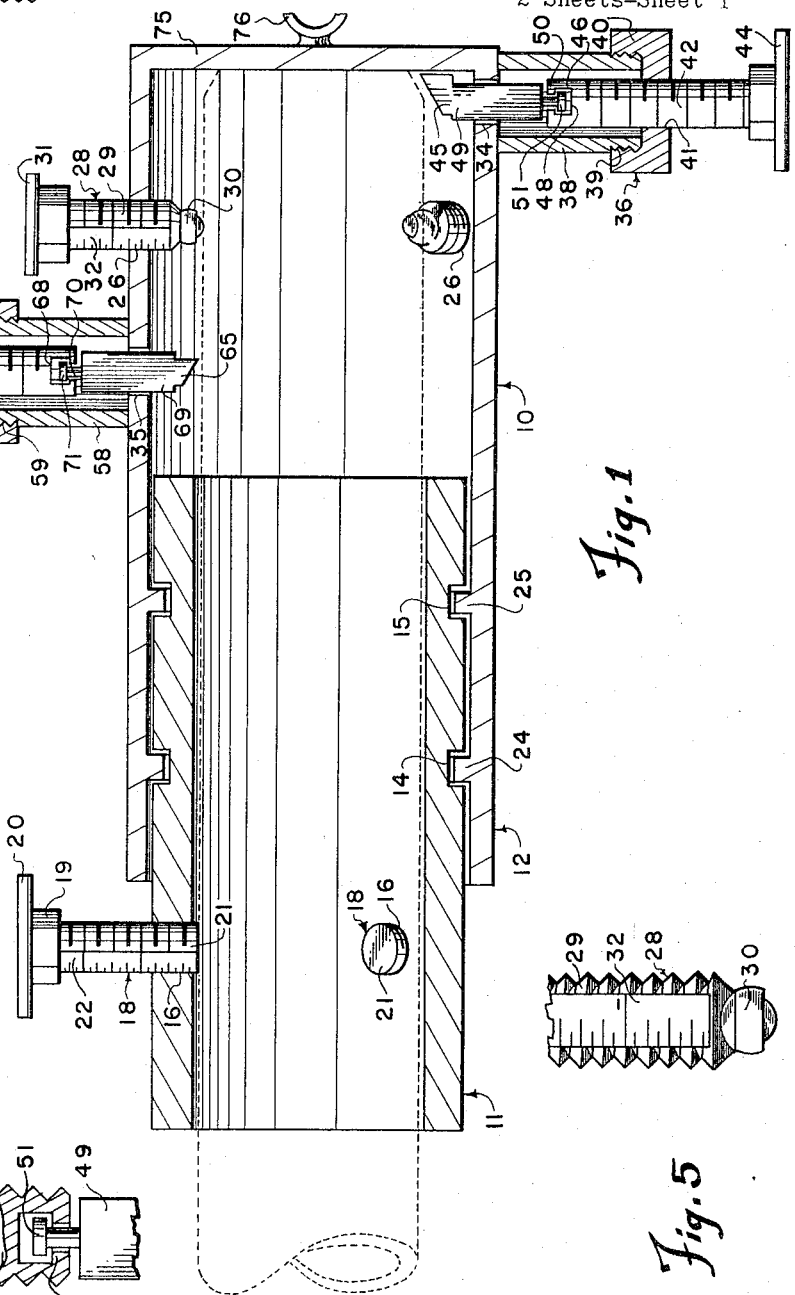
INVENTOR
SIDNEY G. WALTERS
Newton, Hopkins,
Jones & Ormsby
ATTORNEYS Feb. 6, 1968  S. G. WALTERS  3,367,219
PIPE CUTTING AND BEVELING APPARATUS
Filed April 22, 1966  2 Sheets-Sheet 2
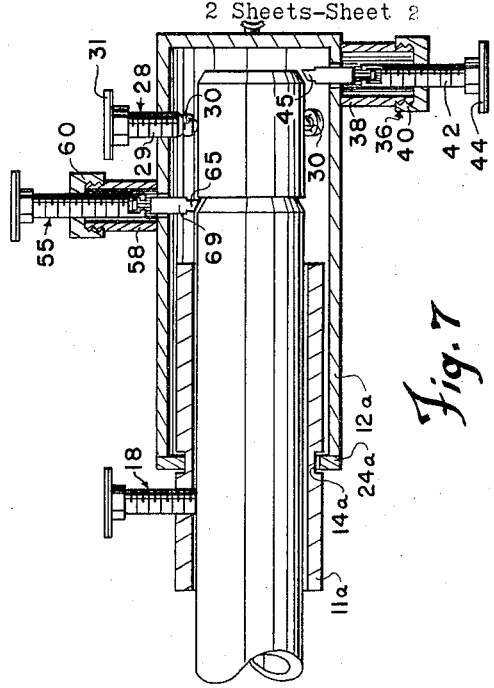
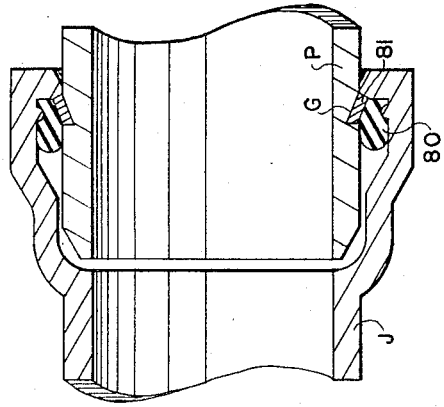
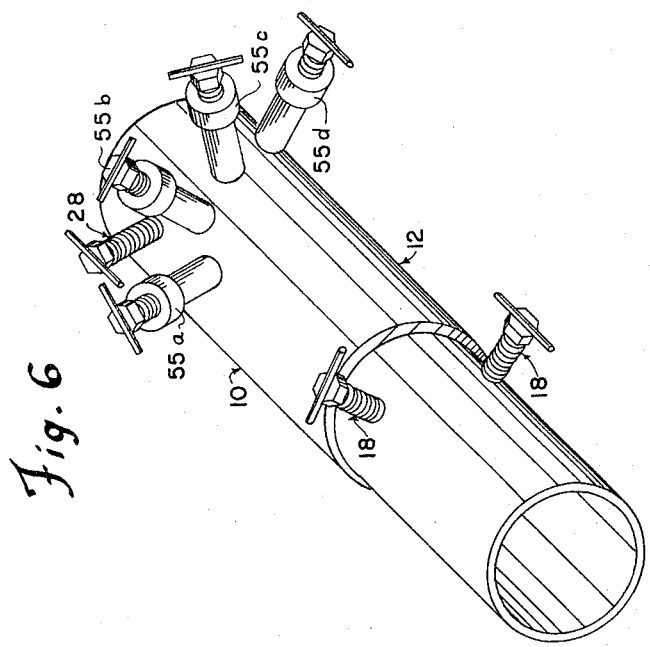
INVENTOR
SIDNEY G. WALTERS
ATTORNEYS 3,367,219
United States Patent Office
Patented Feb. 6, 1968

---

3,367,219
PIPE CUTTING AND BEVELING APPARATUS
Sidney G. Walters, P.O. Box 532,
Thomaston, Ga. 30286
Filed Apr. 22, 1966, Ser. No. 544,432
3 Claims. (Cl. 82—4)

ABSTRACT OF THE DISCLOSURE

Pipe cutting and beveling apparatus for use in the field to selectively cut grooves in pipe sections and bevel the ends of pipes, comprising an open ended cylindrical guide for insertion about and stationary connection to the end of a pipe section to be cut, and a cylindrical cutting assembly rotatably mounted about the cylindrical guide and including inwardly projecting cutting members for engaging the pipe section.

Background of the invention

When assembling sections of cast iron pressure pipe in the field a fluid tight connection must be made between each section of pipe. The usual procedure for attaining a liquid seal is to coat the exterior end surface of the male section with a sealing substance before it is inserted into the female section; however, while this procedure is successful in straight line installations to prevent leakage, the thrust exerted on the pipe by the fluid at the bends in the pipeline at right angle joints, etc., is such that the sections of pipe tend to separate near the joints. Accordingly, other methods of attaching the sections of pipe near the angled joints are required that more firmly secure the sections to each other. It has been found that forming an annular groove around the exterior surface of the pipe near the male connecting end, and connecting the female connecting end of the next adjacent pipe to the male portion with a latching element disposed between the pipes and inserted in the annular groove of the male connecting piece will rigidly connect and seal the sections of pipe to each other so the thrust forces imparted to the angled joints from the liquid flowing through the pipes will not separate the sections of pipe from each other. Of course, when the sections of pipe are being assembled in the field it is difficult to accuratley determine the exact length of pipe sections required. There are occasions when it is quite desirable to be able to bevel and groove the male end of a section of pipe at the location at which it is to be used in order to insert a section of pipe that can be rigidly attached to the next adjacent sections to compensate for the thrust forces encountered by the pipeline.

Summary of the invention

Accordingly, this invention comprises a method and apparatus for beveling and/or grooving the male end of a pipe section at the location at which the pipe section is to be utilized.

Thus, it is an object of this invention to provide a method of grooving and/or beveling the male end of a section of pipe at the location at which the pipe section is to be used.

Another object of this invention is to provide apparatus for grooving the end of a section of pipe, said apparatus being expedient in use at the location of assembly of the pipeline.

Another object of this invention is to provide apparatus for beveling and/or grooving the male end of a section of pipe wherein the groove can be positioned at various distances from the end of the section of pipe.

Another object of this invention is to provide a pipe beveling and grooving apparatus that is simple in construction, expedient in use, and well designed to meet the economics of manufacture.

Other objects, features and advantages of the present invention will become apparent upon reading the following specification, taken in conjunction with the accompanying drawing, in which:

Brief description of the drawing

FIG. 1 is a cross sectional view of the pipe beveling and grooving apparatus;

FIG. 2 is a partial elevational view, with a portion thereof shown in cross section, of the grooving cutter;

FIG. 3 is a partial view of the grooving cutter, showing the cutting portion thereof;

FIG. 4 is a partial showing of the grooving cutter, similar to FIG. 3, but showing a modified cutting portion;

FIG. 5 is a partial view of a bearing utilized to center the pipe section in the grooving and beveling apparatus;

FIG. 6 is a perspective view of a modified form of the invention;

FIG. 7 is a cross sectional view of another form of the invention;

FIG. 8 is a cross sectional view of a joint formed between adjacent pipe sections.

Disclosure of the embodiments

Referring now more particularly to the drawing, in which like numerals indicate like parts throughout the several views, FIG. 1 shows a pipe grooving and beveling apparatus 10 comprising a stationary guide assembly 11 and a rotatable cutting assembly 12. The stationary guide assembly 11 is cylindrical in shape and defines a pair of external, axially displaced annular grooves 14 and 15 therearound near one end, and three apertures 16 circumferentially disposed about a single plane passing perpendicularly through the axis of a guide assembly 11 near its other end. The apertures 16 are threaded to receive threaded set screws 18. The set screws 18 each have a head portion 19 with a bar 20 welded thereto to facilitate manual adjustment of the set screws 18 in their apertures 16. The set screws 18 also each have a flat surface 21 extending longitudinally of the threaded portion thereof. The flat surface 21 has a scale 22 imprinted thereon, with the zero portion of the scale located at the internal end of the set screw. With this construction, the operator of the cutting assembly 12 can rotate a set screw 18 and align its scale 22 with the exterior surface of the guide assembly 11 to determine the degree of penetration of the set screw inside the guide assembly 11. Of course, the scale 22 of the set screw can be calibrated in inches, centimeters, or any other similar calibration, and can also be calibrated so that its zero position is a distance from the end of the set screw that is equal to the thickness of the guide assembly 11 so the operator of the cutting assembly can make a direct reading from the scale of the set screw in determining the penetration of the set screw inside the guide assembly.

The rotatable cutting assembly 12 of the pipe grooving and beveling apparatus 10 comprises an elongate, cylindrical sleeve mounted coaxially with the stationary guide assembly 11. The rotatable cutting assembly 12 includes a pair of internal annular projections 24 and 25 axially spaced from each other a distance equal to the space between the annular grooves 14 and 15 of the stationary guide assembly 11. The rotatable cutting assembly 12 is positioned over the stationary guide assembly 11 so that the internal annular projections 24 and 25 are received in the annular grooves 14 and 15 of the guide assembly 11 so that the cutting assembly 12 is free to rotate about the guide assembly 11 but is unable to move relative to the guide assembly in an axial direction.

The cutting assembly 12 further defines three threaded apertures 26 disposed circumferentially thereabout at equal spaces from each other, and in a plane passing perpendicularly through the cutting assembly 12. Bearing elements 28 are received in the threaded apertures 26 in a manner similar to the set screws 18 of the guide assembly 11. The bearing elements 28 comprise a threaded shank portion 29, a bearing 30 attached to the threaded shank portion 29 at one end thereof, and a bar 31 attached to the threaded shank portion 29 at the exterior end thereof. The bar 31, being similar to the bar 20 of the set screw 18, is merely to facilitate manual rotation of the threaded shank portion 29.

The bearing elements 28, like the set screws 18, also have a flattened side portion extending longitudinally of the threaded portion thereof, with a scale 32 imprinted thereon. The scale 32 can be aligned with the exterior surface of the cutting assembly 12 to determine the amount of penetration of the bearing element 28 inside the cutting assembly 12.

The cutting assembly 12 also defines apertures 34 and 35 spaced from each other along the axis of the cutting assembly 12, and disposed diametrically opposite from each other. The beveling cutting assembly 36 is disposed outwardly of the aperture 34 and comprises a stem 38 surrounding the aperture 34 and extending radially outwardly thereof. The stem 38 is threaded at its outer annular portion 39 and a centrally apertured cap 40 is threaded thereon. The aperture 41 of the cap is threaded and receives the threaded shank 42 of the cutter assembly. The threaded shank 42 includes a bar 44 attached at one end, in a manner similar to the set screws and bearing elements, and a cutter 45 attached to the other end. The internal end 46 of the shank 42 is recessed at 48 to receive an extension of the cutter support 49. The recess 48 is necked down at 50 to form an opening into the recess 48 that is smaller than the recess itself. The cutter support 49 is connected to the shank 42 by means of the T projection 51 having its head portion located in the recess 48 and its stem portion extending outwardly of the recess 48 through the necked down portion 50 of the shank. The T projection is rigidly attached to the cutter support 49, and the cutter 45 is rigidly attached the cutter support 49. The aperture 34 of the cutting assembly 12 is non-circular, and the cutter support 49 is of complementary cross sectional shape so that rotation of the cutter support 49 within the aperture 34 is prohibited.

The threaded shank 42 of the beveling cutting assembly 36 has a flat portion extending longitudinally of the length of the threads, as shown in FIG. 2, and a scale 52, similar to the scales of the set screws and bearing elements, is imprinted thereon. The scale 52 is calibrated so that the operator of the pipe grooving and beveling apparatus can align the scale with the surface of the cap 40 of the beveling cutter assembly 36 to determine the penetration of the cutter 45 inside the pipe grooving and beveling apparatus.

A grooving cutter assembly 55 is positioned outwardly of the aperture 35 of the cutting assembly 12. The grooving cutter assembly is substantially similar to the beveling cutter assembly and has a stem 58 with a threaded outer portion 59 extending radially outwardly of the aperture 35, a cap 60 threaded onto the stem 58, a threaded aperture 61 defined by the cap 60, a threaded shank 62 received in the aperture 61, a bar 64 extending across the threaded shank 62 for manual manipulation of the shank, a recess 68 defined in the threaded shank 42 at its end opposite of the bar 64, a cutter support 69 received in the recess 68 by means of the T projection 71 extending through the necked down portion 70 of the shank 62, a cutter support 69 attached to the T projection 71, and a cutter extending inwardly of the cutting assembly 12 from the cutter support 69. The aperture 35 of the cutting assembly 12 is of non-circular configuration and the cutter support 69 is of complementary cross sectional configuration so that the cutter support will not rotate in the aperture 35. The threaded shank 62 also includes a longitudinally extending scale (not shown) similar to that of set screws 18 and bearing elements 28, for determination of the penetration of the cutter 65 inside the cutting assembly 12.

The grooving cutter assembly 55 is spaced from the beveling cutter assembly 36 a predetermined distance so that the groove to be formed in the pipe section will be spaced properly from the end of the pipe. In the event that the pipe size is varied in which the groove is to be cut so that the groove should be a varying distance from the end of the pipe, the cutter 65 can be removed from the grooving cutter assembly 55 by removing the threaded shank 62, cutter support 69 and cutter 65, and replacing these elements with similar elements as shown in FIGS. 3 and 4. FIGS. 3 and 4 show cutter supports 69a and 69b that are similar to cutter supports 69 and cutters 65a and 65b, similar to cutter 65, but mounted at different positions on the cutter supports 69a and 69b. For instance, cutter 65a is mounted on the side of the cutter support 69a closest to the end of the pipe section to be cut so that the groove formed thereby will be located close to the end of the pipe section; whereas, the cutter 65b is located on the edge of the cutter support 69b located away from the end of the pipe section to be grooved so that the groove formed therein is displaced a longer distance from the end of the pipe section. In this manner, of course, the groove can be spaced at varying distances from the end of the pipe section.

The rotatable cutting assembly 12 of the pipe grooving and beveling apparatus 10 is closed at one end by the end wall 75 and a socket 76 is rigidly attached thereto.

*Operation*

When it is desired to groove or bevel a pipe, the pipe grooving and beveling apparatus 10 is slipped over the end of the pipe that is to be beveled and/or grooved until the end of the pipe rests against the end wall 75 of the rotatable cutting assembly 12. The set screws 18 are then rotated until they engage the pipe section and firmly hold the guide assembly 11 to the pipe section. The set screws 18 are positioned so that the scales thereon are aligned with the surface of the guide assembly 11 at identical points so that the operator is assured that each set screw 18 penetrates the guide assembly 11 an equal distance so that the pipe section is held in coaxial alignment with the guide assembly 11. The bearing elements 28 are then rotated so that the bearings 30 engage the pipe section. The bearing elements are also positioned so that each bearing element penetrates the cutting assembly 12 to an equal depth so that the pipe section is coaxially aligned with a cutting assembly 12. If it is desired to bevel and groove the pipe simultaneously, both the beveling cutter assembly 36 and grooving cutter assembly 55 are manipulated so that their cutters 45 and 65, respectively, engage the pipe section. After firm contact is made with the pipe section by the cutters, the operator makes a note of the reading of the scales on the threaded shanks 42 and 62, respectively, of the cutter assemblies, and then inserts a lever in the socket 76 and rotates the cutting assembly 12. As the cutting assembly 12 rotates, the interior annular projections 24 and 25 thereof ride in the annular grooves 14 and 15, respectively, which allows free rotation of the cutting assembly about the guide assembly 11 without axial movement therebetween. Also, the bearing elements 28 allow the cutting assembly 12 to rotate about the pipe without any undue friction therebetween, while maintaining the cutting assembly 12 in coaxial alignment with the pipe. As the rotatable cutting assembly 12 rotates about the pipe, the cutters 45 and 65 of the beveling cutter assembly 36 and the grooving cutter assembly 55 engage the pipe and cut away portions thereof in an annular path about the pipe. Of course, as the cutting assembly 12 rotates about the pipe the cutter assemblies are tightened so that the cutters 45 and 65 penetrate the pipe to a further extent as the bevel and groove are formed on the pipe. The operator is able to determine the depth of the groove and the extent of the bevel by reading the scales of the cutting assemblies and subtracting the previous reading from the present reading. After the desired penetration has been made into the surface of the pipe, the cutting assemblies 36 and 55 are then retracted, the bearing elements 28 are retracted and the set screws 18 are retracted so that the pipe section can be removed from the pipe grooving and beveling apparatus 10.

If it is desired to bevel or groove a pipe of a different size in a manner so that the bevel and groove should be spaced apart a distance different than the bevel and groove of the previously cut pipe, the threaded shank 62, cutter support 69 and cutter 65 of the grooving cutter assembly are removed and replaced with similar elements having the cutter 65 placed at a different point in the end of the cutter support, as indicated in FIGS. 3 and 4. The different placement of the cutter 65 in this manner spaces the groove cut in the pipe being cut a different distance from the end of the pipe.

FIG. 6 shows a modified form of the invention wherein grooving cutter assemblies 55a, 55b, 55c and 55d are disposed circumferentially about the rotatable cutting assembly 12 at different axial distances from the beveling cutter assembly. With this form of the invention the operator can cut a groove in the pipe section with any one of the grooving cutter assemblies. Of course, since the grooving cutter assemblies are spaced different distances from the beveling cutter assembly, the grooves cut by the various assemblies would be spaced different distances from the end of the pipe section. This construction enables the operator to make instantaneous use of the various different ones of the grooving cutter assemblies without having to replace the threaded shank, cutter support and cutter when it is desired to form the groove in the pipe section a different distance from the end thereof.

While FIG. 1 shows the rotatable cutting assembly 12 being rotatably attached to the stationary guide assembly 11 by means of the interior annular projections 24 and 25 being rotatably received in the annular grooves 14 and 15, respectively, FIG. 7 shows another form of the invention where only a single groove and projection are utilized. The annular groove 14a receives the interior annular projection 24a in a similar manner to that of FIG. 1. Since the guide assembly 11a extends a substantial distance into the rotatable cutting assembly 12a, a high degree of stability is encountered between these concentric members so that little play or freedom is encountered therebetween. Thus, these elements are held in coaxial alignment with only a single groove and projection construction. Furthermore, this manner of construction facilitates the assembly of these elements since the interior annular projection 24a is formed by merely welding an annular ring, or a portion thereof, to the end of the rotatable cutting assembly 12 after the guide assembly 11 has been positioned therein. The remaining elements of the assembly are substantially the same as that shown in FIG. 1.

The pipe sections beveled and grooved with the use of the instant invention can be assembled in the manner as shown in FIG. 8, by inserting the pipe P into the joint J. The joint J has an elastic seal or gasket 80 disposed about its internal annular surface with metal struts 81 disposed on the internal surface of the seal or gasket 80. With this construction, when the pipe P is inserted into the joint J the exterior surface of the pipe slides through the seal or gasket 80 and its metal struts 81 until the groove G of the pipe comes into the vicinity of the metal struts 81, whereupon the elasticity of the seal or gasket 80 causes the metal struts 81 to spring into the grooves G, thereby locking the pipe P to the joint J.

It should be apparent that the pipe grooving and beveling apparatus 10 gives the workman a method of beveling and/or grooving pipe sections in the field at the location at which the pipe sections are to be utilized. Of course, this enables the workman to assemble the pipe sections without the costly delays of ordering a special section of pipe from a centralized source of supply. Furthermore, the simplicity of the construction of the apparatus, its versatility, and its ease of operation make it inexpensive to construct, and convenient and expedient to use in the field.

It will be obvious to those skilled in the art that many variations may be made in the embodiments chosen for the purpose of illustrating the present invention without departing from the scope thereof as defined by the appended claims.

What is claimed as invention is:

1. Apparatus for cutting the surface of a section of pipe comprising:
    connecting means including a cylindrical open ended casing defining a plurality of apertures disposed thereabout, pipe engaging means insertable through said apertures for engaging said section of pipe and maintaining said casing in static connection with said section of pipe, said casing further including at least one exterior annular groove disposed thereabout,
    a rotatable means comprising a cylindrical sleeve disposed about at least a portion of said connecting means and including at least one internally extending annular ring positioned and sized to fit within the exterior annular grooves of said connecting means, said cylindrical sleeve defining at least two non-circular apertures axially displaced from each other along the length of said sleeve, cutting means each including a portion of a configuration conforming to said non-circular apertures extending through said apertures, said sleeve including connecting stems rigidly attached to its exterior surface and disposed about each of said non-circular apertures, said cutting means each including a rotatable adjusting portion threadedly connected to their respective connecting stems, said rotatable adjusting portion of each cutter means each including a scale thereon for alignment with its said connecting stem,
    said rotatable means further defining a plurality of circular apertures disposed thereabout, bearing means inserted through said circular apertures for engagement with said section of pipe, and means connected to said sleeve for rotating said rotatable means about said connecting means.

2. Apparatus for cutting the surface of a section of pipe comprising:
    an open ended cylindrical support casing for rigid concentric attachment about the section of pipe, said support casing defining at least one external annular groove extending thereabout and a series of circumferentially spaced apertures axially spaced from the annular groove, and a connecting member extending through each of the apertures for connecting the support casing to the section of pipe,
    a cylindrical cutter support member concentrically mounted about and partially overlapping said support casing and including an inwardly extending projection received in the annular groove of the support casing whereby the cutter support member is free to rotate about the support casing, said cutter support member defining at least one opening therein and a cutter member extending through said opening, and means for adjusting the extent the cutter member extends through said opening.

3. Apparatus as set forth in claim 2 wherein said cutting member includes a scale for indicating the extent the cutter member extends through said opening.

(References on following page)

References Cited

UNITED STATES PATENTS

| | | | |
|---|---|---|---|
| 873,886 | 12/1907 | McClay | 82—4 |
| 2,079,954 | 5/1937 | Vosper | 82—4 |
| 2,351,217 | 6/1944 | Kopp | 82—4 X |
| 2,796,792 | 6/1957 | Dias | 82—4 |
| 2,861,608 | 11/1958 | Brown | 82—4 X |

HARRISON L. HINSON, *Primary Examiner.*